UNITED STATES PATENT OFFICE.

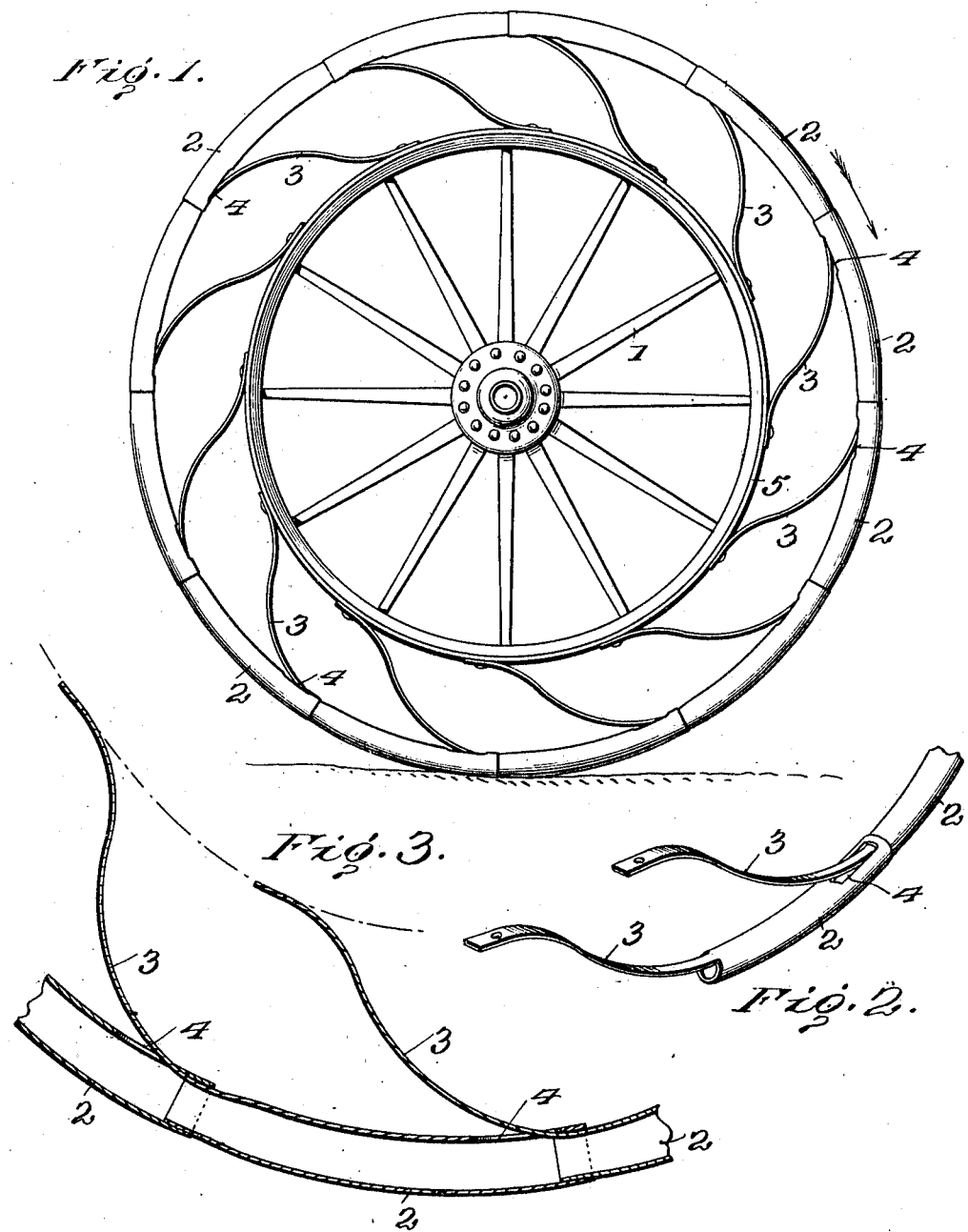

PARKER J. PETERSON, OF STANLEY, TERRITORY OF NEW MEXICO.

SPRING-TIRE.

993,711.  Specification of Letters Patent.  Patented May 30, 1911.

Application filed January 13, 1910. Serial No. 537,894.

*To all whom it may concern:*

Be it known that I, PARKER J. PETERSON, citizen of the United States, residing at Stanley, in the county of Santa Fe and Territory of New Mexico, have invented certain new and useful Improvements in Spring-Tires, of which the following is a specification.

The present invention comprehends certain new and useful improvements in spring tires, and the invention has for its object an improved device of this character which is susceptible of being employed in connection with an ordinary vehicle wheel, and which is particularly efficient in operation and possesses a maximum resiliency of structure, whereby to suplement the work of the vehicle springs and to effectually prevent the shocks incident to travel from being transmitted to the body of the vehicle.

A further object of the invention is a spring tire which is quite durable; which consists of comparatively few parts that are not likely to get out of order; and which is designed to supersede the conventional pneumatic tire and to obviate its many disadvantages.

With these and other objects in view that will more fully appear as the description proceeds, the invention consists in certain constructions and arrangements of the parts that I shall hereinafter fully describe and then point out the novel features of in the appended claim.

For a full understanding of the invention and the merits thereof and also to acquire a knowledge of the details of construction, reference is to be had to the following description and accompanying drawing, in which:

Figure 1 is a side elevation of a wheel equipped with the improvements of my invention. Fig. 2 is a fragmentary view of a tire, and Fig. 3 is a similar view in longitudinal section.

Corresponding and like parts are referred to in the following description and indicated in all the views of the drawing by the same reference characters.

For the purpose of illustration the invention is shown and described in connection with a vehicle wheel 1 that is of conventional form, it being noted, however, that the invention is not limited to use in connection with any particular form of wheel, but is susceptible of general application.

My improved tire consists essentially of an annular metallic tread that encircles the periphery of the wheel in spaced relation thereto, said tread being composed of a plurality of substantially duplicate arcuate sections 2 that have the same degree of curvature and are placed end to end to form a complete circle. The adjacent ends of the sections are designed to be extensibly connected together, and for this purpose the sections are of tubular formation and all taper at one end in the same circular direction. The reduced end of each section is fitted within and is adapted to telescope with the adjacent larger end of the next section in advance, reference being had here to the direction in which the wheel turns, as indicated by the arrow in Fig. 1. By virtue of these telescopic connections the annular tread is rendered susceptible of contracting and expanding freely toward and away from the periphery of the wheel 1. The tire also includes a series of similar leaf springs 3 that are interposed between the tread and the wheel. At its outer end each of these springs is rigidly connected to one of the sections 2 and is preferably integral therewith, as shown, the spring extending from the smaller end of said section and within the next section in advance and passing through an opening 4 formed in the inner side of the last named section in proximity to the larger end thereof, (see Fig. 3). After passing through the respective openings 4, the springs of the series curve forwardly and inwardly toward the periphery of the wheel and preferably have their inner ends detachably secured at regular intervals to a metallic band 5 which is fitted around the rim of the wheel. The springs thus yieldably support the tread sections from the rim and in addition to this function hold the adjacent ends of the sections in association by virtue of being passed through the openings 4. Attention is here directed to the fact that the said openings are elongated in the direction of the length of the sections, so as not to interfere with the free telescopic movement thereof.

In practice the weight of the load is not borne by a single tread section, but is effectually distributed among a plurality of such sections on account of the telescopic connections therebetween, the entire lower portion of the tread being contracted toward the wheel. This manifestly insures of a maximum resiliency of structure and considerably increases the length of life of the parts.

From the foregoing description in connection with the accompanying drawing it will be apparent that I have provided an improved resilient tire which is quite efficient in operation; which embodies to a marked degree the characteristics of simplicity, durability and strength; and which may be easily and cheaply manufactured and consists of comparatively few parts capable of being readily assembled.

It is to be noted that any one of the tread sections together with its supporting spring may be quickly removed and replaced by a new part in case of possible breakage.

Having thus described the invention what is claimed as new is:

A resilient tire including a plurality of arcuate sections placed end to end to constitute an annular tread, each section having the cross sectional contour of a complete tube and being reduced at one end to fit within the larger end of the adjacent section, the meeting ends of the sections having an independent telescopic circumferential movement to effect the expansion and contraction of the tread, the sections being formed with circumferentially elongated openings, and a leaf spring secured to each section and passing outwardly through the opening in the adjacent section to provide a yielding support for the tread, the leaf springs operating in the elongated openings to retain the sections in association and to limit the telescopic movement thereof.

In testimony whereof I affix my signature in presence of two witnesses.

PARKER J. PETERSON. [L. S.]

Witnesses:
W. L. BLACK,
GEO. R. CAMP.

---

Copies of this patent may be obtained for five cents each, by addressing the "Commissioner of Patents, Washington, D. C."